United States Patent
Matsumoto

(10) Patent No.: US 7,272,089 B2
(45) Date of Patent: Sep. 18, 2007

(54) OPTICAL DISC RECORDING UNDER ADJUSTABLE CONDITIONS

(75) Inventor: Keishi Matsumoto, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 512 days.

(21) Appl. No.: 10/108,911

(22) Filed: Mar. 28, 2002

(65) Prior Publication Data

US 2002/0141308 A1 Oct. 3, 2002

(30) Foreign Application Priority Data

Mar. 30, 2001 (JP) ............................. 2001-101832

(51) Int. Cl.
*G11B 7/52* (2006.01)
(52) U.S. Cl. ............................ 369/47.53; 369/13.27; 369/116
(58) Field of Classification Search ............... 369/47.5, 369/47.51, 47.52, 47.53, 53.25, 53.26, 53.27, 369/53.29, 53.3, 53.31, 53.35, 13.26, 13.27
See application file for complete search history.

(56) References Cited

U.S. PATENT DOCUMENTS

| 5,309,419 | A | * | 5/1994 | Koike | 369/47.53 |
| 5,732,061 | A | * | 3/1998 | Kirino et al. | 369/116 |
| 6,480,450 | B1 | * | 11/2002 | Fujii et al. | 369/59.12 |
| 6,556,524 | B1 | * | 4/2003 | Takeshita | 369/47.43 |
| 6,563,775 | B2 | * | 5/2003 | Sato | 369/47.53 |
| 6,577,571 | B2 | * | 6/2003 | Takeda et al. | 369/47.5 |
| 6,711,108 | B2 | * | 3/2004 | Mashimo et al. | 369/47.53 |
| 6,845,071 | B2 | * | 1/2005 | Shoji et al. | 369/47.51 |
| 2002/0105874 | A1 | * | 8/2002 | Matsumoto | 369/47.53 |

FOREIGN PATENT DOCUMENTS

JP 2001-067672 3/2001

OTHER PUBLICATIONS

Device and Method for Recording Optical Disk (JP, 5-225,570), Koike Shigeaki, abstract only.*

* cited by examiner

*Primary Examiner*—Tan Dinh
(74) *Attorney, Agent, or Firm*—Pillsbury Winthrop Shaw Pittman LLP

(57) ABSTRACT

Prior to a main record, a trial write of data in an optical disc is performed in accordance with the characteristics between a record velocity and an optimum record power (Steps S2 to S4). The quality of a signal reproduced from the trial-written data is measured (Step S5). It is judged from the measured quality of the reproduced signal whether the predetermined velocity is a recordable velocity satisfying the characteristics between the record velocity and the optimum record power (Step 5). The main record is executed in accordance with the judgment result.

6 Claims, 3 Drawing Sheets

OPTICAL DISC RECORDING UNDER ADJUSTABLE CONDITIONS

CROSS REFERENCE TO RELATED APPLICATION

This application is based on and claims priority of Japanese patent application No. 2001-101832, filed on Mar. 30, 2001, the whole contents of which are incorporated herein by reference.

BACKGROUND OF THE INVENTION

A) Field of the Invention

The present invention relates to an optical disc recording method and apparatus for recording information in an optical disc such as a compact disc-recordable (CD-R), a compact disc-rewritable (CD-RW), a compact disc-write once (CD-WO), a mini disc (MD) and a digital versatile disc (DVD), and to an optical disc to be used by such a disc recording apparatus, and more particularly to an optical disc recording method and apparatus capable of detecting a proper recording velocity and the fastest recording velocity, and to a disc to be used by such a disc recording apparatus.

B) Description of the Related Art

With the spread of media such as CD-R and CD-RW and recent advances in manufacture technologies, these media are becoming very inexpensive and have the main trends in storage media. With the advent of DVD, technologies of laser used for pickup elements and recording/reproducing technologies have advanced greatly. Some optical disc recording/reproducing apparatuses can be used in the range from a low velocity (1×) to a high velocity (8×, 16×, etc.).

Optimum power control (OPC) is performed in advance to obtain an optimum power in order to record information in a medium at the optimum power, by checking the medium characteristics and laser diode (LD) characteristics and correcting a variation in optical power. OPC is a record power control method by which test data undergoes trial write in a power calibration area (PCA) at the innermost circumference of an optical disk by stepwise changing a record power of an LD and at a predetermined record velocity (linear velocity), and β of signals reproduced from the recorded test data are evaluated to determine the record power with the best β as the optimum record power at that record velocity. Generally, the optimum record power changes with the record velocity, and the characteristics of an optimum record power relative to a record velocity of each medium are prepared.

JP-A-5-225570 discloses a method of obtaining the characteristics of an optimum record power relative to a record velocity by determining two optimum record powers by performing OPC at two different record velocities and executing an interpolation or extrapolation process of the two optimum record powers.

The record velocity-optimum record power characteristics by OPC are obtained by optimum record powers at predetermined record velocities. These characteristics do not contain the information of whether an error occurs if new data is written thereafter at some record velocity and the information of the fastest recordable velocity.

Requirements of recording data in an optical disc at as high a velocity as possible are becoming high in order to shorten a record time of an optical disc which can be recorded at a high velocity. Some optical discs have packages labeled as 8×, 16× or the like. This label may be used as a criterion for determining the fastest recordable velocity. The velocity written on this label has usually some margin by considering a warp of an optical disk, pigment variation and the like. Data can be written in some media at a velocity faster than the fastest recordable velocity written on the label. CD-R does not provide information of the fastest recordable velocity. Some media do not support recording at a low velocity (1×) or at a high velocity (8× or higher). In such cases, if only the record velocity-optimum record power characteristics by OPC are relied, write-once and reproduction may become impossible because of a low quality of recorded data.

In a so-called partial CAV record, data is recorded from the inner circumference of an optical disc under constant angular velocity (CAV) control, and after the velocity reaches the fastest recordable velocity, data is recorded up to the outermost circumference under constant linear velocity (CLV) control. It is important for the partial CAV record to determine a proper fastest recordable velocity in order to shorten the record time. The fastest velocity of CAV record is not necessarily equal to or faster than a CLV enabled velocity in the inner circumference. It is difficult to determine a correct fastest recordable velocity by using only conventional OPC.

SUMMARY OF THE INVENTION

An object of this invention is to provide an optical disc recording method and apparatus capable of reliably recording data at a desired record velocity by using preliminarily prepared record velocity-optimum record power characteristics, and an optical disc to be used by such an optical disc recording apparatus.

Another object of this invention is to provide an optical disc recording method and apparatus capable of recording data at the fastest recordable velocity by using preliminarily prepared record velocity-optimum record power characteristics, and an optical disc to be used by such an optical disc recording apparatus.

According to one aspect of the present invention, there is provided an optical disc recording method comprising the steps of: (a) performing at a predetermined velocity a trial write of data in an optical disc capable of recording data, prior to a main record, in accordance with characteristics between a record velocity and an optimum record power; (b) measuring the quality of a signal reproduced from the data trial-written at the step (a); (c) judging from the quality of the reproduced signal measured at the step (b) whether the predetermined velocity is a recordable velocity satisfying the characteristics between the record velocity and the optimum record power; and (d) performing the main record in accordance with the judgement made at the step (c).

According to another aspect of the invention, there is provided an optical disc recording apparatus comprising: a motor for rotating an optical disc; an optical pickup for applying a recording/reproducing laser beam to the optical disc and detecting the laser beam reflected from the optical disc; and a controller for controlling a revolution number of the motor and an optical power of the optical pickup when data is recorded in the optical disc, the controller: controlling the revolution number of the motor and the optical power of the optical pickup to perform a trial write of data in the optical disc at a predetermined velocity, prior to a main record of the optical disc, in accordance with characteristics between a record velocity and an optimum record power; measuring a quality of signal reproduced from the trial-written data; judging from the measured quality of the reproduced data whether the predetermined velocity is a recordable velocity satisfying the characteristics between the record velocity and the optimum record power; and executing a main record in accordance with a judgement result.

Prior to a main record in an optical disc, a trial write of data in the optical disc is performed in accordance with the characteristics between a record velocity and an optimum record power. The quality of a signal reproduced from the trial-written data is measured. It is judged from the measured quality of the reproduced signal whether the predetermined velocity is a recordable velocity satisfying the characteristics between the record velocity and the optimum record power. The main record is executed in accordance with the judgement result. The main record of data without errors can be performed at the record velocity judged as a recordable velocity.

The predetermined velocity for trial write of data in an optical disc in accordance with the characteristics of the record velocity and the optimum record power may be set by a predetermined method (e.g., a method of sequentially lowering the predetermined velocity starting from a predetermined record velocity), and a fastest recordable velocity satisfying the characteristics between the record velocity and the optimum record power is determined. The main record is executed in accordance with the fastest recordable velocity. The main record can be performed at a recordable high velocity without errors. In this case, an estimated record time may be calculated from the determined fastest recordable velocity to display the fastest recordable velocity and estimated record time.

The characteristics between the record velocity and the optimum record power can be prepared, for example, by executing optimum power control (OPC) of an optical disc. The trial write of data may be performed relative to a trial write area outside the lead-out area of an optical disc, or to a power calibration area (PCA) of an optical disc. If an optical disc is a recordable and erasable medium, the trial write is performed relative to the data record area, and after the quality of a reproduced signal is measured, the trial-written data is erased so that a wasteful trial write area does not occupy the data record area.

The main record may be performed by partial CAV record wherein data is recorded in constant angular velocity control from the innermost circumference of an optical disc to the position where the record velocity reaches the determined fastest recordable velocity, and then data is recorded in constant linear velocity control from the position where the record velocity reaches the fastest recordable velocity to the outermost circumference. With the partial CAV record, the main record at a high velocity is possible at the highest degree of the characteristics and performances of an optical disc and recording apparatus.

As above, the main record without error can be performed at the record velocity judged as a recordable velocity.

DESCRIPTION OF THE PREFERRED EMBODIMENTS

Figure 1:
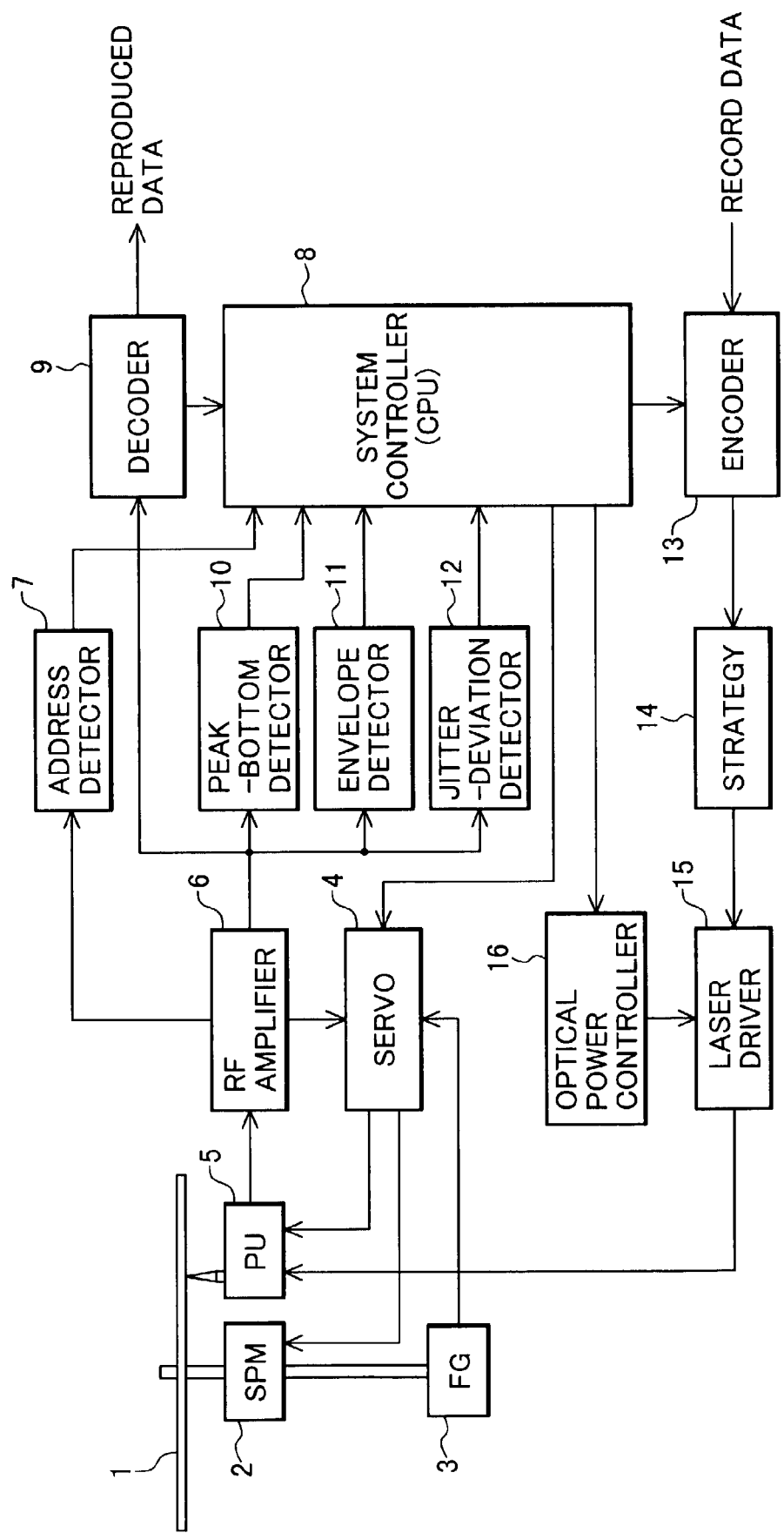
FIG. 1 is a block diagram showing the structure of an optical disc recording apparatus according to a first embodiment of the invention.

Description will be made on the preferred embodiments of the invention, referring to the drawings. FIG. 1 is a block diagram showing the main structure of an optical disc recording apparatus according to an embodiment of the invention.

An optical disc 1 has a unicursal spiral track extending from the innermost circumference to outermost circumference in a record area. A record linear density control signal is superposed along the track at a constant linear density in order to define a data record linear density. In this example, the record linear density control signal corresponds to wobbles including Absolute Time In Pregroove (ATIP) time codes which show absolute time information. The optical disc 1 is rotated by a spindle motor (SPM) 2. A frequency generator (FG) 3 made of a Hall element or the like is coupled to the rotary shaft of the spindle motor 2. FG pulses output from the frequency generator 3 are input to a servo circuit 4.

For CAV control of the optical disc 1, the servo circuit 4 controls the rotation of the spindle motor 2 by synchronizing the FG pulse with a main clock. The optical disc 1 can therefore be rotated at a constant angular velocity. For CLV control of the optical disc 1, the servo circuit 4 controls the rotation of the spindle motor 2 by synchronizing a wobble signal, which is read from the optical disc 1 via an optical pickup 5 and amplified by an RF amplifier 6, with the main clock. The optical disc 1 can therefore be rotated at a constant linear velocity.

The wobble signal output from the RF amplifier 6 is supplied to an address detector 7 which derives an ATIP time code and an ATIP clock from the wobble signal and detects an address of the optical disc 1. The detected address is supplied to a system controller (CPU) 8. The system controller 8 identifies the record position along the radial direction of the optical disc 1 from the input address, and outputs the main clock changed with the record position to the servo circuit 4.

An output of the RF amplifier 6, i.e., an reproduced signal, is input to a decoder 9 whereat the reproduced signal is subjected to Eight to Fourteen Modulation (EFM) and Cross Interleaved Reed-Solomon Code (CIRC) decoding and output as reproduced data. With the modulation and decoding, a C1 error and a SYNCEQ signal (sync signal) are detected and supplied to the system controller 8. The reproduced signal output from the RF amplifier 6 is also supplied to a peak-bottom detector 10, an envelope detector 11, and a jitter-deviation detector 12. The peak-bottom detector 10 detects peak and bottom values of the reproduced signal and detects therefrom a reflectivity of the optical disc, an HF amplitude, a modulation degree, β (asymmetry) and the like. The envelope detector 11 detects an envelope of the reproduced signal. The jitter-deviation detector 12 detects a jitter and a deviation from the reproduced signal. These C1 error, SYNCEQ, reflectivity, HF amplitude, modulation degree, jitter, deviation and the like are parameters indicating the quality of a reproduced signal. These parameters will be later described.

Record data is input to an encoder 13 whereat it is subjected to CIRC/EFM encoding in accordance with an EFM clock supplied from the system controller 8. A write strategy circuit 14 generates record pulses suitable for recording, from the encoded record data. This record pulse is supplied to a laser driver 15. In accordance with the record velocity-optimum power characteristics, the system controller 8 controls the laser driver 15 via an optical power controller 16. A laser beam with an optimum power is therefore radiated from the optical pickup 5, and record pits at the linear density corresponding to EFM clocks are formed on the optical disc 1.

Next, the record operation of the optical disc recording apparatus constructed as above will be described.

Figure 2:
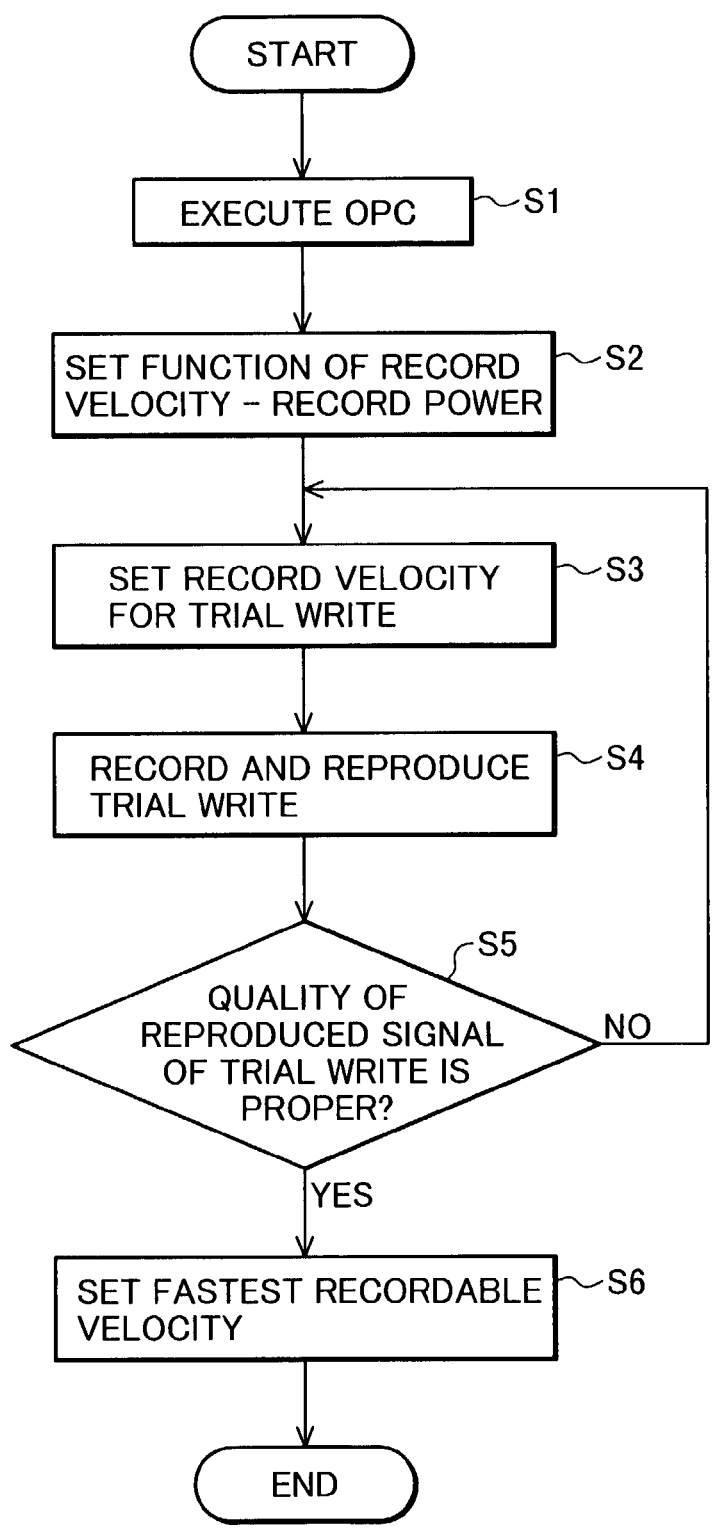
FIG. 2 is a flow chart illustrating a process of setting the fastest recordable velocity for the optical disc recording apparatus.

FIG. 2 is a flow chart illustrating a process of setting the fastest recordable velocity to be executed before a main record.

First, OPC is executed (Step S1). Specifically, a test pattern undergoes trial write in PCA formed in the innermost circumferential area of an optical disk 1, by stepwise changing a record power of the optical pickup 5 and at a predetermined record velocity. A record area of the trial write is reproduced. The peak value a and bottom value b of the reproduced signal are detected by the peak-bottom detector 10. The asymmetry $\beta=(a-b)/(a+b)$ is calculated from the peak value a and bottom value b. The record power which was used for recording a signal corresponding to the reproduced signal having an optimum asymmetry $\beta$ is determined as the optimum power at the record velocity. Thereafter, by sequentially changing the record velocity, the optimum powers at different record velocities are obtained.

Figure 3:
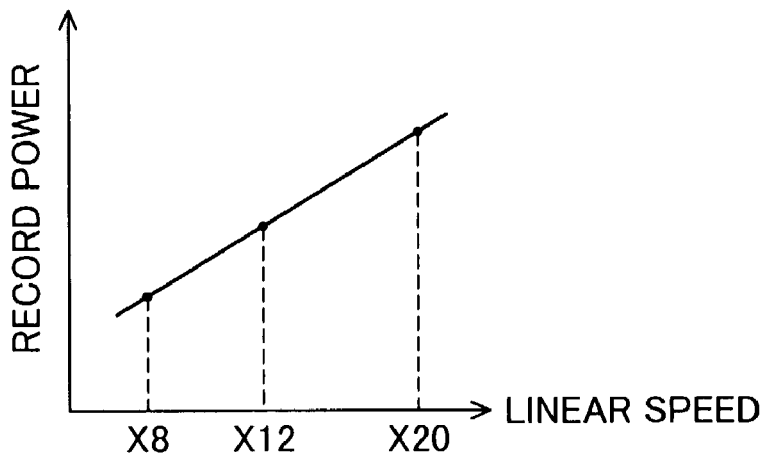
FIG. 3 is a graph sowing a record velocity-optimum power characteristics of the optical disc recording apparatus obtained by OPC.

FIG. 3 shows the record velocity-optimum record power characteristics (function) obtained in the manner described above. These characteristics are set as the characteristics of the optical disc 1 (Step S2).

Next, a record velocity for trial write is set (Step S3). The initial record velocity may be set to the recording apparatus as the fastest record velocity (e.g., 20×), or information of the initial record velocity may be written in the optical disc 1. Next, trial write is performed at the initial record velocity (Step S4). If data in the optical disc is not erasable, the trial write area is preferably an area different from the actual data record area, such as PCA and an area outside the lead-out area of the outermost circumference of the optical disc. If data in the optical disc is erasable, trial write may be performed in the data record area, and after evaluation the data is erased.

Next, the area of the trial write is reproduced to judge whether the quality of the reproduced signal is proper (Step S5). The parameters for indicating the quality of a reproduced signal may be the following parameters detected by the decoder 9 and various detectors 10 to 12:

(1) Cl error: the number of error blocks (BLER) of a reproduced signal;

(2) Jitter: standard deviations of pit and land lengths of a reproduced signal;

(3) Deviation: differences between reference lengths and pit and land lengths of a reproduced signal;

(4) SYNCEQ: a signal indicating whether a frame sync signal is detected or not. In this example, the number of signals detected in a predetermined time (frame), i.e., the number of synchronizations (the number of sync equals), is measured to use it as a decision criterion;

(5) $\beta$ (asymmetry): an index indicating a record depth; asymmetry of a reproduced signal (after AC coupling); and (6) Reflectivity: a reflectivity of a reproduced signal relative to the total reflection.

The parameters (1) to (3) are preferably used to judge whether actually recorded data can be read correctly. For example, if the rated values of the Red Book (standard for CD), the Orange Book (standard for CD-R, CD-RW) and the like are used as slice levels, whether or not the quality of a reproduced signal is proper can be determined from the following settings:

(a) Cl error: 220 frame/sec or lower;

(b) Jitter: 35 nsec or shorter; and (c) Deviation: ±40 ns or shorter (for 3T) or ±60 ns or shorter (for 11T).

If it is judged from the evaluation that the quality is improper, the flow returns to Step S3 following a NO arrow. The record velocity is lowered by one step (Step S3) and trial write is again performed (Sep S4). If it is finally judged that the reproduced signal quality is proper (Sep S5), the record velocity is set as the fastest recordable velocity (Step S6). The step of lowering the velocity may be set beforehand to the recording apparatus or it may be written in the optical disc 1. The step of lowering the velocity may be changed with the result of the initial trial write or the preceding trial write.

Figure 4:
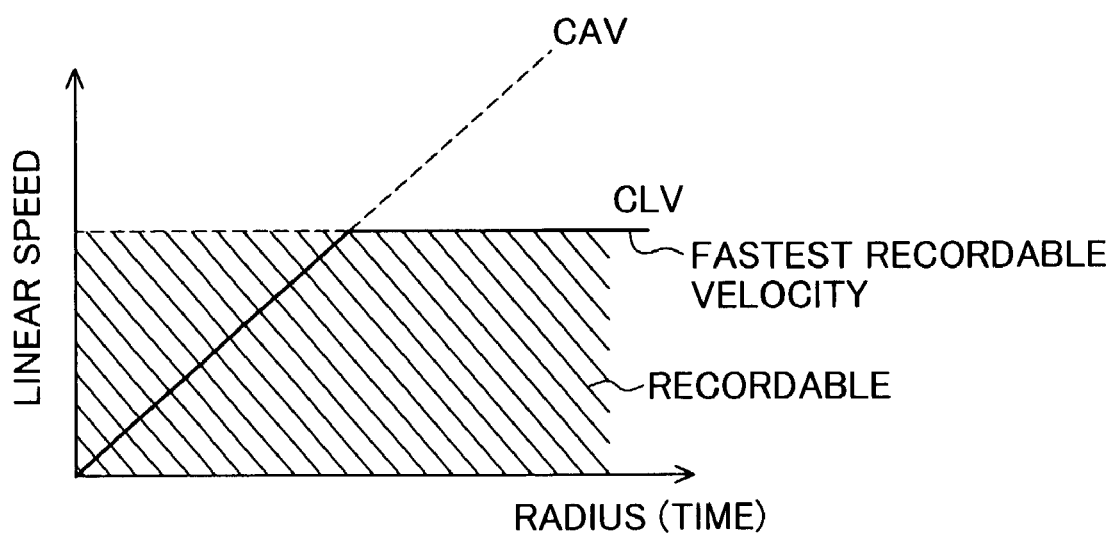
FIG. 4 is a graph illustrating a partial CAV record operation.

With the above processes, the fastest recordable velocity can be determined. After the fastest recordable velocity is determined, a main record is executed relative to the data record area. FIG. 4 is a graph illustrating a main record of partial CAV record. Data can be properly recorded in an optical disc without error at a velocity of the fastest recordable velocity or slower. Therefore, CAV record is performed starting from the innermost circumference until the velocity reaches the fastest recordable velocity, and when the fastest recordable velocity is obtained, the CAV record is switched to CLV record. In this manner, the record at the fastest velocity becomes possible and the record time can be shortened.

In this embodiment, the fastest recordable velocity is searched by gradually lowering the record velocity from the fastest velocity. Instead, the fastest recordable velocity may be searched by gradually increasing the record velocity from the slowest velocity or it may be searched through binary search of narrowing the search range by a half step between the current and previous velocities.

The present invention has been described in connection with the preferred embodiments. The invention is not limited only to the above embodiments. It is apparent that various modifications, improvements, combinations, and the like can be made by those skilled in the art.

What we claim are:

1. An optical disc recording method comprising:

(a) performing at a predetermined velocity a trial write of data in an optical disc capable of recording data, prior to a main record, in accordance with characteristics between a record velocity and an optimum record power, wherein the predetermined velocity is set by a predetermined method;

(b) measuring the quality of a signal reproduced from the data trial-written at said step (a);

(c) judging from the quality of the reproduced signal measured at said step (b) whether the predetermined velocity is a recordable velocity satisfying the characteristics between the record velocity and the optimum record power;

(d) determining a fastest recordable velocity satisfying the characteristics between the record velocity and the optimum record power; and (e) performing the main record in accordance with the fastest recordable velocity, wherein said step (d) determines the fastest recordable velocity satisfying the characteristics between the record velocity and the optimum record power, by gradually lowering the predetermined velocity for the trial write of the data in the optical disc set in accordance with the characteristics, starting from a predetermined record velocity.

2. An optical disc recording method comprising:
(a) performing at a predetermined velocity a trial write of data in an optical disc capable of recording data, prior to a main record, in accordance with characteristics between a record velocity and an optimum record power, wherein the predetermined velocity is set by a predetermined method;
(b) measuring the quality of a signal reproduced from the data trial-written at said step (a);
(c) judging from the quality of the reproduced signal measured at said step (b) whether the predetermined velocity is a recordable velocity satisfying the characteristics between the record velocity and the optimum record power;
(d) determining a fastest recordable velocity satisfying the characteristics between the record velocity and the optimum record power; and
(e) performing the main record in accordance with the fastest recordable velocity,
wherein said step (e) records data in the optical disc from an innermost circumference thereof under constant angular velocity control until the record velocity reaches the determined fastest recordable velocity, and records data under constant linear velocity from a position when the record velocity reaches the fastest recordable velocity to an outermost circumference.

3. An optical disc recording method comprising:
(a) performing at a predetermined velocity a trial write of data in an optical disc capable of recording data, prior to a main record, in accordance with characteristics between a record velocity and an optimum record power, wherein the predetermined velocity is set by a predetermined method;
(b) measuring the quality of a signal reproduced from the data trial-written at said step (a);
(c) judging from the quality of the reproduced signal measured at said step (b) whether the predetermined velocity is a recordable velocity satisfying the characteristics between the record velocity and the optimum record power;
(d) determining a fastest recordable velocity satisfying the characteristics between the record velocity and the optimum record power;
(e) performing the main record in accordance with the fastest recordable velocity;
(f) calculating an estimated record time of the optical disc from the determined fastest recordable velocity; and
(g) displaying the fastest recordable velocity and the estimated record time.

4. The optical disc recording method according to claim 1 further including:
(f) calculating an estimated record time of the optical disc from the determined fastest recordable velocity; and
(g) displaying the fastest recordable velocity and the estimated record time.

5. The optical disc recording method according to claim 2 further including:
(f) calculating an estimated record time of the optical disc from the determined fastest recordable velocity; and
(g) displaying the fastest recordable velocity and the estimated record time.

6. The optical disc recording method according to claim 3 further including:
(f) calculating an estimated record time of the optical disc from the determined fastest recordable velocity; and
(g) displaying the fastest recordable velocity and the estimated record time.

* * * * *